Patented Nov. 29, 1927.

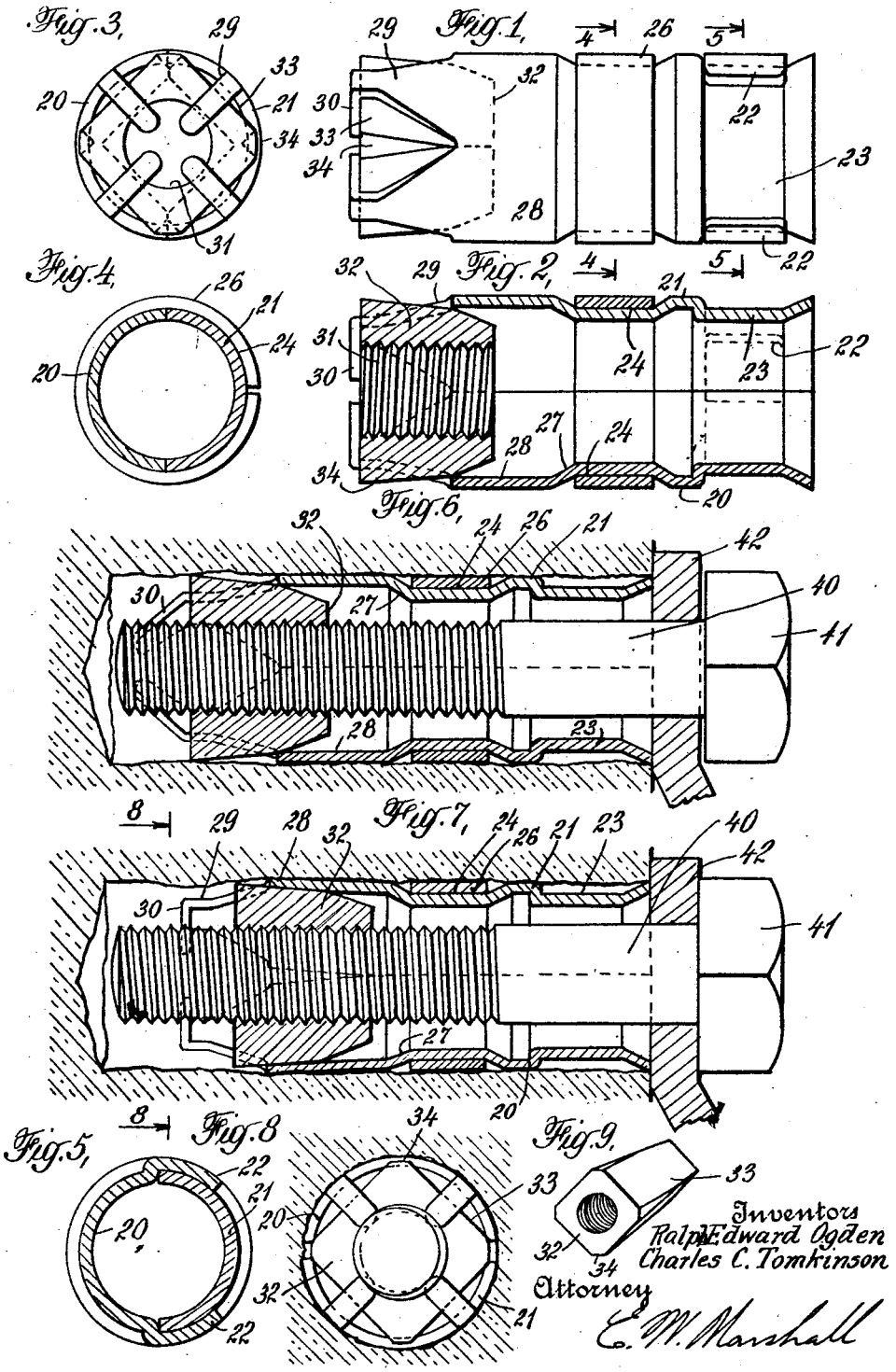

1,650,957

UNITED STATES PATENT OFFICE.

RALPH EDWARD OGDEN, OF CORNWALL, NEW YORK, AND CHARLES C. TOMKINSON, OF PLAINFIELD, NEW JERSEY, ASSIGNORS TO JOHN EDWARD OGDEN, OF MOUNTAINVILLE, NEW YORK.

BOLT ANCHOR.

Application filed November 21, 1922. Serial No. 602,387.

This invention relates to improvements in bolt anchors of the character employed for obtaining anchorage in walls of brick or stone or cementitious material not adapted to directly receive a threaded element or bolt.

One of the objects of the invention is to provide an expansion shield that may be set deep in the wall and need not extend to the outer end of the opening in the wall in order to be properly and firmly anchored therein.

Another object of the invention is to provide a shield so constructed as to form an abutment for the bolt upon the initial rotation thereof whereby the nut carried by the bolt will be fed along the bolt.

Another object of the invention is to provide an expansion shield so constructed and arranged that the bolt or threaded element used in conjunction therewith will be firmly secured or locked thereto against removement.

Another object of the invention is to provide an expansion shield and an expanding member therefor that are simple in construction, efficient in operation and may be economically manufactured.

Further objects of the invention will appear from the following specification taken in connection with the drawings, which form a part of this application, and in which Fig. 1 is an elevation of an expansion shield and expanding bolt constructed in accordance with the invention.

Fig. 2 is a longitudinal sectional elevation of the construction shown in Fig. 1.

Fig. 3 is an end elevation of the construction shown in Fig. 1.

Fig. 4 is a transverse sectional elevation taken substantially on line 4—4 of Fig. 1.

Fig. 5 is a transverse sectional elevation taken substantially on line 5—5 of Fig. 1.

Fig. 6 is a longitudinal sectional elevation, showing the bolt anchor and expansion shield mounted in a wall and in partially expanded position.

Fig. 7 is a sectional elevation similar to Fig. 6, but showing the elements in their completely expanded positions.

Fig. 8 is a transverse elevation taken substantially on line 8—8 of Fig. 7.

Fig. 9 is a perspective view showing one form of nut that may be used in connection with the bolt to expand the expansion shield.

The objects of the invention are attained in the forms of the invention shown by an expansion shield comprising a plurality of sections. The shield is substantially cylindrical and has formed thereon at its inner end a plurality of tapered fingers having their end portions bent inwardly toward the axis of the shield and extending to a position overlapping the threaded element or bolt when said element is in position in the shield. The expansion of the shield is effected by an expanding element shown in the form of a nut, which is adapted to be threaded on the threaded element or bolt and to travel along this bolt as the bolt is rotated. The nut has formed thereon tapered portions and in the particular embodiment of the invention illustrated, these tapered portions take the form of a truncated pyramid, which may have any desired number of sides. As the bolt is rotated, the nut will travel along the bolt and force the fingers into tight engagement with the bore of the opening in which the element is placed, the fingers being disposed between the bore of the opening and the outer surfaces of the nut, which form chords with respect to the substantially cylindrical bore of the opening also. The surfaces have been referred to as flat, but these surfaces need not necessarily be flat. They may be curved or have any other desired shape.

Referring to the drawings, the particular form of expansion shield illustrated comprises a pair of sections 20 and 21, the section 20 having tabs 22 adapted to seat in a depressed portion 23 of section 21 thereby retaining the sections together.

Each of the sections is preferably formed from sheet metal of uniform thickness and has formed thereon intermediate its ends an annular groove or depression 24, these portions being disposed in registration with each other on the two sections and receiving a band or split ring 26, which provides excess metal and assists in retaining the shield in position upon its expansion.

The depression or groove 24 forms a shoulder 27 in the shield, which acts as a stop for limiting the longitudinal movement of the nut in a manner hereinafter described.

Next adjacent the annular shoulder 27, the shield has a cylindrical portion 28 and extending longitudinally from the cylindrical portion is a plurality of tapered fingers 29. The fingers 29 have extensions 30, which are bent inwardly and as shown in Fig. 3 extend to a position overlapping the threaded opening 31 and the expanding nut 32.

In the form of the invention shown the nut 32 has the form of a truncated pyramid having sides or faces 33. The pyramid may have as many sides as desired or, in other words, its section may be in the form of a triangle, quadrangle, or other polygon. In the form of the invention shown, the corners of the nut are slabbed off or cut as shown at 34.

Upon the initial rotation of the bolt 40 in the nut 32, the nut will be held against longitudinal movement by the tapered fingers until the end of the bolt engages the extensions 30 of the fingers. The bolt will then be temporarily held against longitudinal movement and the nut will travel along the bolt until the nut encounters opposition to its longitudinal movement, by the cylindrical portion 28 of the shield.

The bolt will then force the extensions 30 of the fingers outwardly as shown in Fig. 7 and will travel therethrough until the head 41 of the bolt encounters resistance such as that formed by the object 42 to be secured by the bolt anchor. Continued rotation of the bolt will thereafter cause the extensions 30 of the fingers to move longitudinally on the bolt working along the spiral of the threads and to buckle, forcing the portion 29 of the shield into tight engagement with the bore of the opening as shown in Fig. 8. The extensions 30 by their abutment with the threads of the bolt and with the wall of the opening in which the anchor is inserted form toggles which expand the shield in the hole and lock the bolt against reverse rotation. In a large wall opening the extensions 30 may assume the position shown in Fig. 7. In a smaller opening the extensions will assume some angular position intermediate that shown in Fig. 6 and that shown in Fig. 7. Regardless of the size of the opening the expanding and locking action, due to the toggle is positive and effective. The nut 32 will also travel along the bolt, further forcing this portion of the shield against the bore of the opening, thereby securely and firmly anchoring the shield in position in the bore independently of the expanding action of the toggle. With this form of expansion shield, the engagement of the extensions 30 of the shield with the bolt and the buckling of these members will render the withdrawal of the bolt from the shield practically impossible. The bolt is, therefore, securely locked in position in the expansion of the cylindrical portion 28 of the shield. It will be noted that this portion will be forced outwardly by the tapered faces of the nut and will be tightly wedged between these surfaces, which form chords, and the bore of the opening in which the shield is positioned.

Although certain specific embodiments of the invention have been particularly shown and described, it will be understood it is capable of modification and that changes in the construction and arrangement of the various cooperating parts may be made without departing from the spirit or scope of the invention as expressed in the following claims.

What we claim is:

1. An expansion shield comprising a tubular member having longitudinally tapered fingers of uniform thickness formed at the inner end of its peripheral surface, and a nut for expanding said shield, embraced by said fingers and having a plurality of surfaces engaged by each of said fingers, said nut having the form of a truncated pyramid.

2. In combination, an expansion shield comprising a tubular member having longitudinally extending tapered fingers of uniform thickness, said fingers forming V-shaped openings in the peripheral surface of the tubular member at the inner end of the shield and a nut having tapered corners projecting into the openings and having a substantially flat surface engaged by each of said fingers.

3. In combination, an expansion shield comprising a tubular member having longitudinally extending tapered fingers of uniform thickness, said fingers forming V-shaped openings in the peripheral surface of the tubular member at the inner end of the shield and a nut having tapered corners projecting into the openings, and extending substantially to the outside diameter of the tubular member.

4. An expansion shield comprising a tubular member having longitudinally tapered fingers of uniform thickness formed at the inner end of its peripheral surface, and a nut disposed in the shield and having tapered corners positioned between the tapered portions of said fingers, said nut having tapered sides extending from one end toward the other end of the shield.

5. An expansion shield having at the inner end of its peripheral surface fingers with inturned ends of sufficient length to engage the threads of a bolt after said bolt has been projected into the shield, means to radially expand said fingers upon rotary movement of the bolt, and means to expand said shield independently of said fingers effected by said movement.

6. In an expansion shield having inturned portions at one end thereof, the combination with a bolt, means to primarily expand said shield comprising a nut on the bolt, and means to secondarily expand said shield by a toggle action of said portions upon engagement with said bolt, each expansion being effected by the rotary movement of said bolt.

7. In an expansion shield, the combination with a bolt, means to lock said bolt in said shield comprising inturned portions of said shield, said portions being adapted to grip the threads of said bolt upon rotary advancement thereof, and means engaged by said bolt independent of said locking means to expand said shield.

8. An expansion shield comprising a tubular member having longitudinally tapered fingers of uniform thickness formed at the inner end of its peripheral surface in combination with a bolt, and a nut disposed in the shield and having corners positioned between the tapered portions of said fingers, said nut having tapered sides extending from one end toward the other end of the shield, means to expand said shield by a toggle action of said fingers upon engagement with said bolt during rotary movement thereof, and additional means to expand said shield upon movement of said nut along said bolt during said rotary movement.

In witness whereof, I have hereunto set my hand this 29th day of August, 1922.

RALPH EDWARD OGDEN.

In witness whereof, I have hereunto set my hand this 29th day of August, 1922.

CHARLES C. TOMKINSON.